Oct. 30, 1945.  A. A. ARNHYM  2,387,708
SPILL FOR AIRCRAFT
Filed May 9, 1944
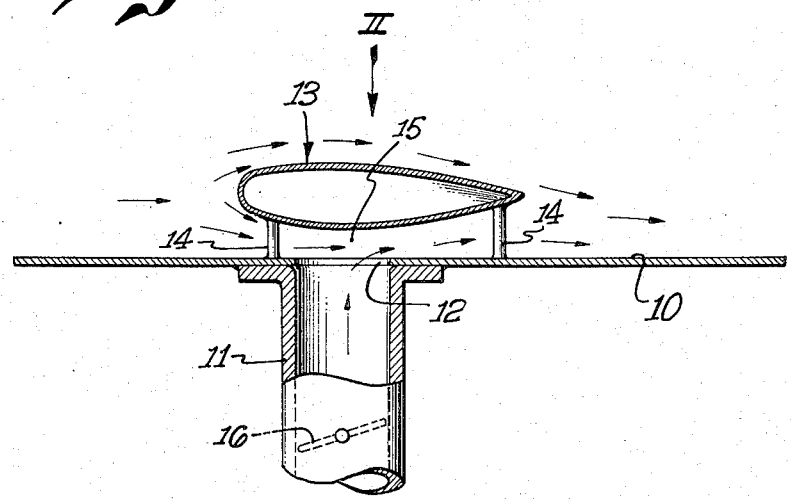
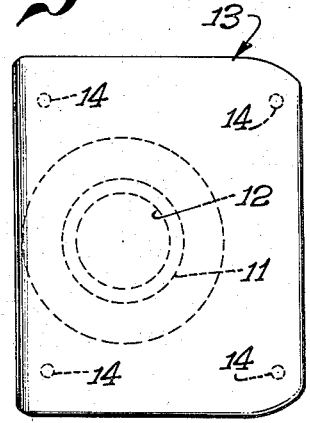
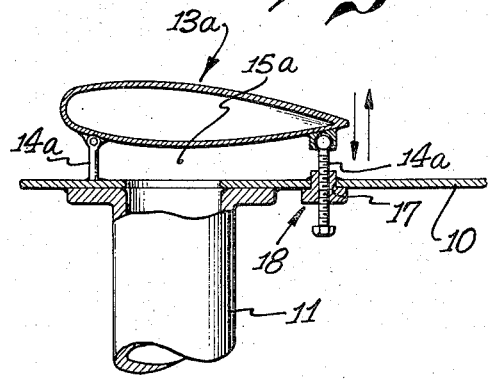
ALBERT A. ARNHYM,
INVENTOR.
BY
ATTORNEY.

Patented Oct. 30, 1945

2,387,708

UNITED STATES PATENT OFFICE 2,387,708

SPILL FOR AIRCRAFT

Albert A. Arnhym, Los Angeles, Calif., assignor to Solar Aircraft Company, San Diego, Calif., a corporation of California Application May 9, 1944, Serial No. 534,795

1 Claim. (Cl. 98—20)

This invention relates to structures for exhausing air and other gases from moving vehicles, ships, and aircraft, and is particularly useful in connection with bodies moving through the air at high speeds, such as aircraft.

It is old to discharge gases, such as exhaust ventilation air, from the interior of an aircraft fuselage by running the discharge duct to an orifice in the skin of the fuselage, and then creating suction at the orifice, to remove the gases, by means of a hood or shroud positioned over the orifice and having an opening facing rearwardly so that the slip stream tends to create a vacuum at the orifice. The hood or shroud may be likened to the ventilating scoops on ships except that it faces away from the wind instead of into it. Such structures are objectionable primarily because they substantially increase the air resistance of the aircraft, particularly when the amount of gas to be discharged is relatively large, which requires that the hood or shroud be correspondingly large and project a substantial distance out into the slip stream.

An object of the present invention is to provide an exhaust structure, or "spill," for aircraft and the like that has the necessary exhausting capacity without unduly increasing the air resistance of the ship.

Briefly, the structure whereby I achieve the stated object consists of a miniature air-foil mounted oposite the discharge orifice in spaced relation to the skin of the fuselage so that it functions therewith to produce a Venturi passage through which a portion of the slip stream passes. As is well known, the rapid movement of the air through the venturi creates a region of reduced pressure at the throat thereof, which is located adjacent the discharge orifice. Hence, the air-foil functions to aid the discharge of the gas through the orifice, but at the same time it offers relatively little additional air resistance to the forward movement of the airplane, because it is inherently of an efficient shape aerodynamically. In fact, under some conditions, the additional air-foil may be employed to provide a useful additional lift to the aircraft.

In the drawing:

Fig. 1 is a sectional view through a portion of a spill structure in accordance with the invention;

Fig. 2 is a plan view taken in the direction of the arrow II of Fig. 1; and

Fig. 3 is a view similar to Fig. 1 showing adjustable struts for varying the position of the airfoil.

Referring to the drawing, a portion of the skin of an airplane is indicated at 10. Skin 10 may be a portion of the fuselage of a wing or of some other portion of an aircraft structure. Since only a small portion of the skin 10 is shown in the drawing, it has been indicated as substantially flat but it is to be understood that it may have a curvature.

As the skin 10 is shown in Fig. 1, the upper side thereof is the exterior and is exposed to the air stream moving therepast. The under side of the skin defines the wall of a chamber which may be a cabin if the skin 10 is a part of the fuselage. There is shown attached to the inner surface of the skin 10 a portion of a duct 11 for exhausting air or other gas to the exterior of the aircraft. The duct may connect to a chamber to be ventilated, or conceivably it might be employed to discharge exhaust gas from an engine, a heater or any other device. The essential point is that this duct 11 conducts gas to an orifice 12 in the skin 10, through which it is discharged.

It is often possible to locate the orifice 12 in a portion of the skin of a fuselage or wing that is at negative pressure during flight so that gas is naturally exhausted therefrom. However, it is frequently desirable to locate the orifice 12 in a portion of the skin that is at positive pressure during flight, under which circumstances it is necessary to provide some exterior structure adjacent the orifice that will act in response to the rush of air therepast to create a negative pressure at the orifice 12. Heretofore scoops or spills faced rearwardly have been provided over orifices to create the desired suction but, as previously indicated, they have been objectionable because they introduced excessive air resistance to forward movement of the aircraft.

In accordance with the present invention, I provide the necessary negative pressure at the orifice 12 without materially increasing the air resistance, by employing an auxiliary air-foil 13 mounted on the skin 10 opposite the orifice 12 with its thickest portion substantially juxtaposed to the orifice. The air-foil 13 may be supported from the skin 10 by a plurality of struts 14 which are preferably streamlined so that they introduce minimum additional air resistance.

It will be observed from Fig. 1 that the lower side of the air-foil 13 defines, with the adjacent portion of the outer surface of the skin 10, a crude Venturi passage, the throat 15 of which is opposite the orifice 12. As is well known, the velocity of the air flowing through a Venturi passage is greatest and the static pressure of the air is the lowest at the throat of the passage. Hence a reduction in pressure is obtained at the orifice 12, which facilitates the discharge of gas therethrough from the duct 11. At the same time, by virtue of the fact that the auxiliary airfoil 13 is of a design having inherently low air resistance, the resistance to forward movement of the aircraft is increased less than it would be by conventional spill structures.

Ordinarily it will be desirable to position the air-foil 13 with its longitudinal plane of symmetry substantially parallel to the skin 10 since in this position it will offer the minimum resistance to forward movement. However, if the structure is located on the under side of a fuselage or wing (so that the gas to be discharged flows downwardly through the duct 11), it may be desirable to space the rear end of the air-foil 13 further away from the skin 10 than is shown in Fig. 1. This would not decrease the suction produced by the air-foil at the orifice 12 and the surface of the air-foil most remote from the skin 10 might perform a useful lifting effect.

By making one or more of the supporting struts 14 extensible, the angle of the air-foil 13 relative to the adjacent skin 10 can be altered to permit variations of the suction produced in the orifice 12. This suction can be varied either by varying the lengths of all of the struts so as to move the air-foil closer to or farther away from the orifice, or by varying the length of only a portion of the struts, the angle of the longitudinal plane of the air-foil can be shifted to vary the pressure at the orifice.

Thus, as shown in Fig. 3, the struts 14a may be pivotally connected at their outer ends to the air-foil 13a and may extend through apertures 17 in the skin 10 provided therefor with screw adjustment means 18 for variably extending the struts 14 through the skin 10 to vary the position and angle of the air-foil 13a relative to the skin 10.

There is shown in the duct 11 a butterfly valve 16 for regulating the rate of discharge of the gas through the duct. However, this butterfly does not constitute a part of the present invention and need not always be employed.

Although for the purpose of explaining the invention a specific embodiment thereof has been illustrated in the drawing and described, various departures from the exact construction shown can be made while still utilizing the advantages of the invention, and the latter is to be limited only to the extent set forth in the appended claim.

I claim:

A spill structure for exhausting fluid out of a craft adapted to move at high speed through a fluid medium, said structure comprising a discharge orifice in a wall of the craft, which wall is at least approximately parallel to the direction of normal motion of the craft, an air-foil juxtaposed to said orifice in spaced relation to the exterior surface of said wall, said air-foil having its thickest portion opposite said orifice, whereby to provide a Venturi passage between the air-foil and said wall, the throat of which venturi is adjacent said orifice to reduce the pressure therein in response to rapid movement of said craft through the air, and adjustable strut means extending between said wall and said air-foil for adjustably supporting different portions of said air-foil at adjustable distances from said wall.

ALBERT A. ARNHYM.